(12) United States Patent
Yabes et al.

(10) Patent No.: US 8,219,291 B2
(45) Date of Patent: Jul. 10, 2012

(54) METHOD OF CONTROLLING A VEHICLE DURING AN AUXILIARY PUMP FAILURE

(75) Inventors: Emmanuel V. Yabes, Canton, MI (US); Brian J. Pellerito, Ortonville, MI (US); Michael Chernyak, Farmington Hills, MI (US); Craig J. Hawkins, Howell, MI (US); Cheol W. Kim, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 145 days.

(21) Appl. No.: 12/870,883

(22) Filed: Aug. 30, 2010

(65) Prior Publication Data

US 2012/0053799 A1 Mar. 1, 2012

(51) Int. Cl.
*G06F 7/00* (2006.01)

(52) U.S. Cl. ........... 701/54; 701/51; 701/55; 701/61; 701/84; 701/90; 701/95; 701/101; 701/112; 477/11; 477/15; 477/17; 477/19; 477/34; 477/77; 477/101; 477/107; 477/115; 180/53.4; 180/65.28; 180/269; 180/336; 180/337

(58) Field of Classification Search ........... 701/54, 701/51, 55, 61, 95, 84, 112, 101, 90, 29.1, 701/31.4, 32.7, 33.2, 34.4; 477/11, 15, 17, 477/19, 34, 77, 101, 99, 107; 180/53.4, 65.8, 180/269, 337, 336
See application file for complete search history.

(56) References Cited

U.S. PATENT DOCUMENTS

| | | | | |
|---|---|---|---|---|
| 5,583,844 A * | 12/1996 | Wolf et al. | ......... | 701/1 |
| 5,778,329 A * | 7/1998 | Officer et al. | ......... | 701/55 |
| 6,052,640 A * | 4/2000 | Wu | ......... | 701/67 |
| 2005/0080527 A1* | 4/2005 | Tao et al. | ......... | 701/34 |
| 2012/0053799 A1* | 3/2012 | Yabes et al. | ......... | 701/54 |

\* cited by examiner

*Primary Examiner* — Redhwan k Mawari
(74) *Attorney, Agent, or Firm* — Quinn Law Group, PLLC

(57) ABSTRACT

A method of controlling a vehicle includes signaling a transmission to shift into a first gear ratio and sensing a current gear ratio of the transmission after signaling the transmission to shift into the first gear ratio. The method further includes implementing a diagnostic transmission shift control strategy to override a normal transmission shift control strategy when the current sensed gear ratio is not equal to the requested first gear ratio to verify proper functionality of a mode control valve that is responsible for shifting the transmission into the first gear ratio.

17 Claims, 3 Drawing Sheets

|  | 1st | 2nd | 3rd | 4th | 5th | 6th | R |
|---|---|---|---|---|---|---|---|
| C 1 | X |  |  |  |  |  | X |
| C 2 | X | X | X | X |  |  |  |
| C 3 |  | X |  |  |  | X |  |
| C 4 |  |  | X |  | X |  | X |
| C 5 |  |  |  | X | X | X |  |

FIG.2

METHOD OF CONTROLLING A VEHICLE DURING AN AUXILIARY PUMP FAILURE

TECHNICAL FIELD

The invention generally relates to a method of controlling a vehicle, and more specifically to a method of controlling a hybrid vehicle having an engine, a transmission and an auxiliary hydraulic pump for the transmission.

BACKGROUND

Hybrid vehicles may include an engine, a transmission and an auxiliary hydraulic pump for the transmission. The transmission requires a pressurized hydraulic fluid to operate, e.g., shift between different gear ratios. When the engine is operating, the engine powers a primary hydraulic pump that pressurizes the hydraulic fluid for the transmission. When the engine is not operating, the auxiliary hydraulic pump is engaged to provide the pressurized hydraulic fluid to the transmission. The auxiliary hydraulic pump is generally an electrically powered pump.

When the vehicle comes to a stop, the vehicle may initiate an auto stop/start engine protocol, which stops the engine when the vehicle is idle, and then restarts the engine when the vehicle begins to move again. When the engine is stopped in the auto stop/start engine protocol, the auxiliary hydraulic pump is engaged to provide the transmission with the pressurized hydraulic fluid required to shift the transmission into a first gear ratio, i.e., a low gear ratio, in order to prepare the vehicle for launch.

The transmission uses the pressurized hydraulic fluid to move a mode control valve between an "on" position and an "off" position. The mode control valve includes a spool, which is moved between the on position and the off position by hydraulic fluid pressure applied to either end of the spool. For example, to move the mode control valve into the on position, an electronic solenoid directs a fluid pressure to a first end of the spool, whereas to move the mode control valve into the off position, fluid pressure is applied to a second end, i.e., an opposite end, of the spool, while the electronic solenoid removes the fluid pressure from the first end of the spool. When the mode control valve is in the on position, the mode control valve engages a first clutch, which shifts the transmission into the first gear ratio. When the mode control valve is in the off position, the mode control valve engages a different clutch, which shifts the transmission into a different gear, i.e., a higher gear having a lower gear ratio. If the mode control valve and/or the auxiliary hydraulic pump fail when the engine is stopped, then the transmission may not shift into the first gear ratio in preparation for launching the vehicle, resulting in a high gear launch of the vehicle.

The vehicle operates diagnostic algorithms to determine if the auxiliary hydraulic pump and/or the mode control valve are functioning properly, i.e., to determine if the auxiliary hydraulic pump, the electronic solenoid and/or the mode control valve have failed or have not failed. If the auxiliary hydraulic pump fails, the vehicle may register an error code indicating that the auxiliary hydraulic pump has failed. Similarly, if the mode control valve or the electronic solenoid fails, the vehicle may register an error code indicating that the mode control valve or the electronic solenoid has failed.

In the event the auxiliary hydraulic pump has failed when the vehicle initiates the auto stop/start engine protocol and comes to a stop, the mode control valve may become "latched". The mode control valve is latched when hydraulic fluid pressure is applied to the second end of the mode control valve before the hydraulic fluid pressure is applied to the first end of the mode control valve to move the mode control valve into the on position. When the mode control valve is latched, the mode control valve does not shift the transmission into the first gear ratio. Under these conditions, the diagnostic algorithms may falsely indicate that the mode control valve has failed and the auxiliary hydraulic pump has not failed, when in fact the auxiliary hydraulic pump has failed and the mode control valve has not failed, but is merely latched and being prevented from moving into the on position.

SUMMARY

A method of controlling a vehicle having a transmission and an auxiliary hydraulic pump is provided. The method includes initiating an auto stop/start engine protocol, sensing an operational status of the auxiliary hydraulic pump, and signaling the transmission to shift into a first gear ratio in preparation to launch the vehicle. The method further includes sensing a gear ratio of the transmission after signaling the transmission to shift into the first gear ratio. The method further includes disabling the auto stop/start engine protocol when the sensed gear ratio of the transmission is not equal to the first gear ratio and the auxiliary hydraulic pump is sensed to be operable, and implementing a diagnostic transmission shift control strategy to override a normal transmission shift control strategy to verify proper functionality of a mode control valve when the sensed gear ratio of the transmission is not equal to the first gear ratio and the auxiliary hydraulic pump is sensed to be operable.

A method of controlling a vehicle having an engine, a transmission and an auxiliary hydraulic pump is also provided. The method includes stopping operation of the engine, engaging operation of the auxiliary hydraulic pump, signaling the transmission to shift into a first gear ratio in preparation to launch the vehicle, and sensing a gear ratio of the transmission after signaling the transmission to shift into the first gear ratio. The method further includes re-engaging operation of the engine when the sensed gear ratio of the transmission is equal to a fourth gear ratio, and implementing a diagnostic transmission shift control strategy to override a normal transmission shift control strategy to verify proper functionality of a mode control valve when the sensed gear ratio of the transmission is not equal to the first gear ratio and when the auxiliary hydraulic pump is sensed to be operable.

Accordingly, the vehicle implements the diagnostic transmission shift control logic when the sensed transmission gear ratio is different than the first gear ratio requested. The diagnostic transmission shift control logic forces the engine on, i.e., starts the engine, to provide the pressurized hydraulic fluid to the transmission, and modifies sequencing and pressure limits for a plurality of solenoids in the transmission that control the movement of the mode control valve. The diagnostic transmission shift control logic allows the vehicle to isolate the mode control valve from the auxiliary hydraulic pump and encourages the mode control valve to shift the transmission into the first gear ratio to determine if the mode control valve has failed when the sensed gear ratio of the transmission is not equal to the first gear ratio.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a table showing clutch combinations for specific gear ratios of a transmission.

DETAILED DESCRIPTION

A hybrid vehicle may include an engine, a transmission and an auxiliary hydraulic pump. The transmission requires a pressurized hydraulic fluid to operate, e.g., shift between different gear ratios. When the engine is operating, the engine powers a primary hydraulic pump that pressurizes the hydraulic fluid for the transmission. When the engine is not operating, the auxiliary hydraulic pump is engaged to provide the pressurized hydraulic fluid to the transmission. The auxiliary hydraulic pump is generally an electrically powered pump.

Figure 1:
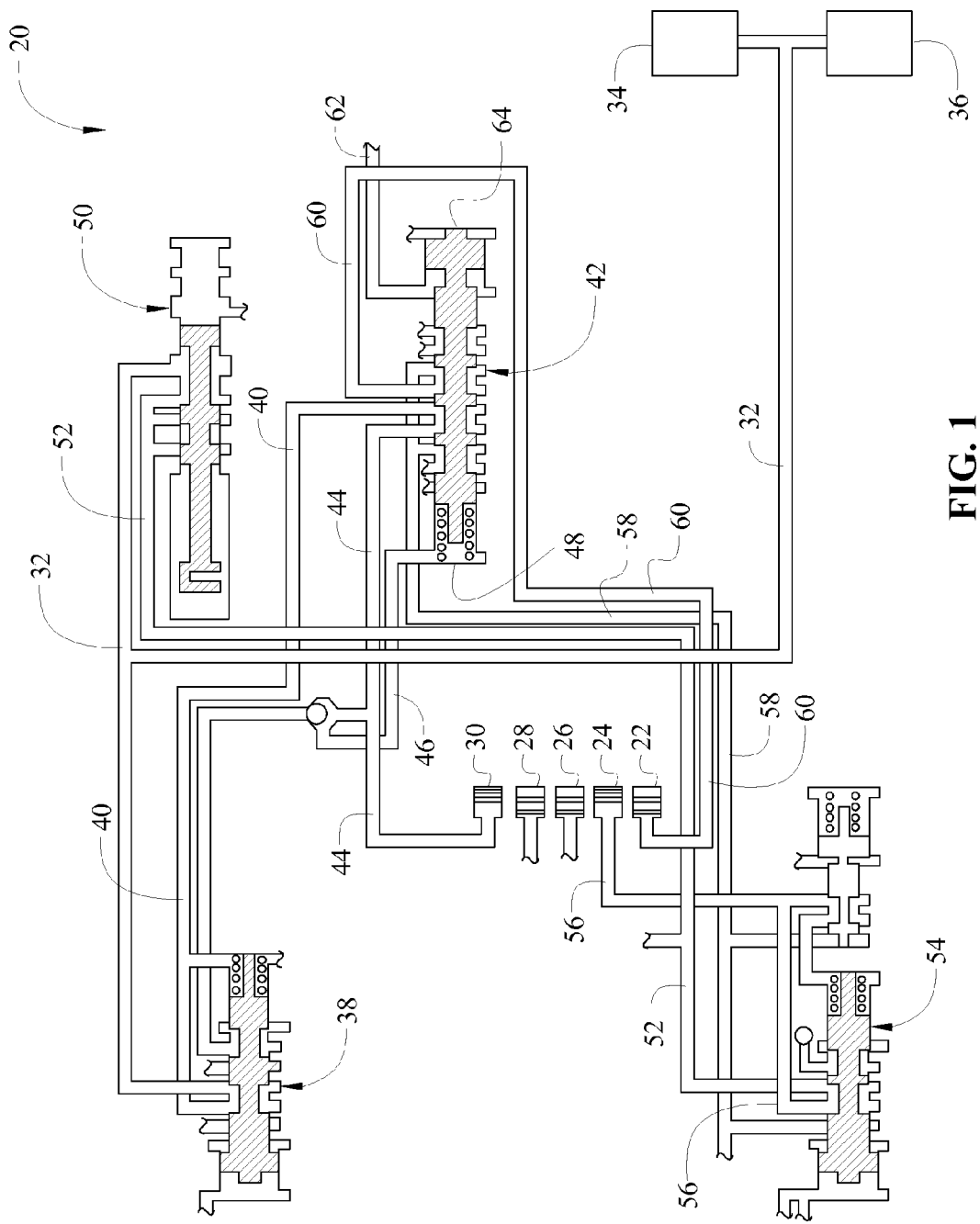
FIG. 1 is a partial schematic hydraulic diagram of a transmission of a vehicle.

Referring to FIG. 1, wherein like reference numerals indicate like parts, a transmission is generally shown at 20. For purposes of clarity, elements of the transmission 20 not pertinent to the description and understanding of the invention are omitted. As shown, the transmission 20 includes five clutches, i.e., a first clutch 22, a second clutch 24, a third clutch 26, a fourth clutch 28 and a fifth clutch 30. The transmission 20 selectively engages the clutches to define six forward gear ratios and one reverse gear ratio.

Referring to FIG. 2, the different clutch combinations for the different gear ratios are shown. Within FIG. 2, the first clutch 22 is referred to as "C 1", the second clutch 24 is referred to as "C 2", the third clutch 26 is referred to as "C 3", the fourth clutch 28 is referred to as "C 4" and the fifth clutch 30 is referred to as "C 5". Additionally, the first gear ratio is referred to as "1st", the second gear ratio is referred to as "2nd", the third gear ratio is referred to as "3rd", the fourth gear ratio is referred to as "4th", the fifth gear ratio is referred to as "5th", the sixth gear ratio is referred to as "6th" and the reverse gear ratio is referred to as "R". The columns for the different gear ratios indicate which clutches are engaged in order for the transmission 20 to achieve that specific gear ratio. Of particular note for the detailed description of this invention, the first clutch C 1 (22) and the second clutch C 2 (24) are engaged when in the first gear ratio, and the second clutch C 2 (24) and the fifth clutch C 5 (30) are engaged when in the fourth gear ratio. The first gear ratio is the lowest gear having the highest gear ratio of the six forward gear ratios, and the sixth gear ratio is the highest gear having the lowest gear ratio of the six forward gear ratios.

A supply line 32 connects the primary hydraulic pump 34 and the auxiliary hydraulic pump 36 to various valves and/or solenoids in the transmission 20. The supply line 32 supplies the various valves and/or solenoids with pressurized hydraulic fluid. The supply line 32 is in fluid communication with a first regulator valve 38. A first fluid line 40 interconnects the first regulator valve 38 and a mode control valve 42. The first regulator valve 38 controls fluid communication between the supply line 32 and the first fluid line 40. The first regulator valve 38 may include, but is not limited to a solenoid actuated hydraulic spool valve or the like. A second fluid line 44 interconnects the mode control valve 42 and the fifth clutch 30 in fluid communication. As described in greater detail below, the mode control valve 42 is moveable between an "on" position and an "off" position to control fluid communication between the first fluid line 40 and the second fluid line 44. When the mode control valve 42 is in the off position, the first fluid line 40 and the second fluid line 44 are in fluid communication and the fifth clutch 30 is engaged. A latch line 46 interconnects the second fluid line 44 and a second end 48 of the mode control valve 42 in fluid communication. Fluid pressure from the latch line 46 urges the mode control valve 42 into the off position.

The supply line 32 is also in fluid communication with a gear selector valve 50. The gear selector valve 50 is manually operated by a driver to switch the transmission 20 between functions. The functions of the transmission 20 may include, but are not limited to, a forward drive function, a reverse drive function, a neutral gear function and a park function. A third fluid line 52 interconnects the gear selector valve 50 and a second regulator valve 54. The gear selector valve 50 controls fluid communication between the supply line 32 and the third fluid line 52. Accordingly, when certain functions of the gear selector valve 50 are selected, the gear selector valve 50 opens fluid communication between the supply line 32 and the third fluid line 52.

A fourth fluid line 56 interconnects the second regulator valve 54 and the second clutch 24 in fluid communication. A fifth fluid line 58 interconnects the second regulator valve 54 and the mode control valve 42. The second regulator valve 54 controls fluid communication between the third fluid line 52 and the fourth fluid line 56. The second regulator valve 54 also controls fluid communication between the third fluid line 52 and the fifth fluid line 58. The second regulator valve 54 may include, but is not limited to, a solenoid actuated hydraulic spool valve or the like. A sixth fluid line 60 interconnects the mode control valve 42 and the first clutch 22 in fluid communication. When the mode control valve 42 is in the on position, the first fluid line 40 and the sixth fluid line 60 are in fluid communication and the first clutch 22 is engaged.

A signal line 62 is in fluid communication with a first end 64 of the mode control valve 42 to provide pressurized hydraulic fluid to the first end 64 of the mode control valve 42. Fluid pressure from the signal line 62 urges the mode control valve 42 into the on position.

As noted above, the transmission 20 uses the pressurized hydraulic fluid to move the mode control valve 42 between the "on" position and the "off" position. The mode control valve 42 includes a spool, which is moved between the on position and the off position by hydraulic fluid pressure applied to either end of the spool. For example, to move the mode control valve 42 into the on position, fluid pressure is applied to the first end 64 of the spool via the signal line 62, whereas to move the mode control valve 42 into the off position, fluid pressure is applied to the second end 48 of the spool, opposite the first end 64, via the latch line 46. When the mode control valve 42 is in the on position, the mode control valve 42 engages a first clutch 22, which shifts the transmission 20 into the first gear ratio when the second clutch 24 is also engaged. When the mode control valve 42 is in the off position, the mode control valve 42 engages a different clutch, i.e., the fifth clutch 30, which shifts the transmission 20 into a different gear, i.e., a higher gear having a lower gear ratio. As shown in FIG. 2, the fourth gear ratio is defined when the second clutch 24 and the fifth clutch 30 are both engaged. Accordingly, when the second clutch 24 is engaged, the mode control valve 42 selectively engages and disengages a first clutch 22 and a fifth clutch 30 to shift between the first gear ratio and a fourth gear ratio when the mode control valve 42 moves between the on position and the off position.

In order to conserve fuel, the vehicle may initiate an auto stop/start engine protocol. The auto stop/start engine protocol turns off the engine as the vehicle comes to rest, for example at a stop light, and re-engages the engine once the vehicle begins to accelerate again. When the engine is stopped, the vehicle engages the auxiliary hydraulic pump 36 to provide the pressurized hydraulic fluid to the transmission 20, so that the transmission 20 may, for example, shift into the first gear ratio in preparation for launch. Under certain conditions, such as when the vehicle slows from the fourth gear ratio to a stop, the auto stop/start engine protocol is initiated to stop the engine, and the auxiliary hydraulic pump 36 is not functioning properly, then the mode control valve 42 may be latched in the off position, and unable to move to the on position to disengage the fifth clutch 30 and engage the first clutch 22 to shift into the first gear ratio. Such a circumstance may cause a fourth gear ratio launch of the vehicle. If the mode control valve 42 is latched in the off position, then vehicle diagnostic algorithms may falsely indicate that the mode control valve 42 has failed, and falsely indicate that the auxiliary hydraulic pump 36 has not failed, i.e., passed the auxiliary hydraulic pump diagnostic algorithms.

The disclosed invention provides a method of controlling the vehicle under conditions that may lead to the fourth gear ratio launch, and prevent a false indication that the mode control valve 42 has failed the diagnostic algorithms. As described herein, the method is embodied as an algorithm operable on a transmission control module. The transmission control module is in communication with a vehicle controller for receiving and sending information therebetween related to the control of the transmission 20. However, it should be appreciated that the method may be embodied in some other manner not described herein.

Figure 3:
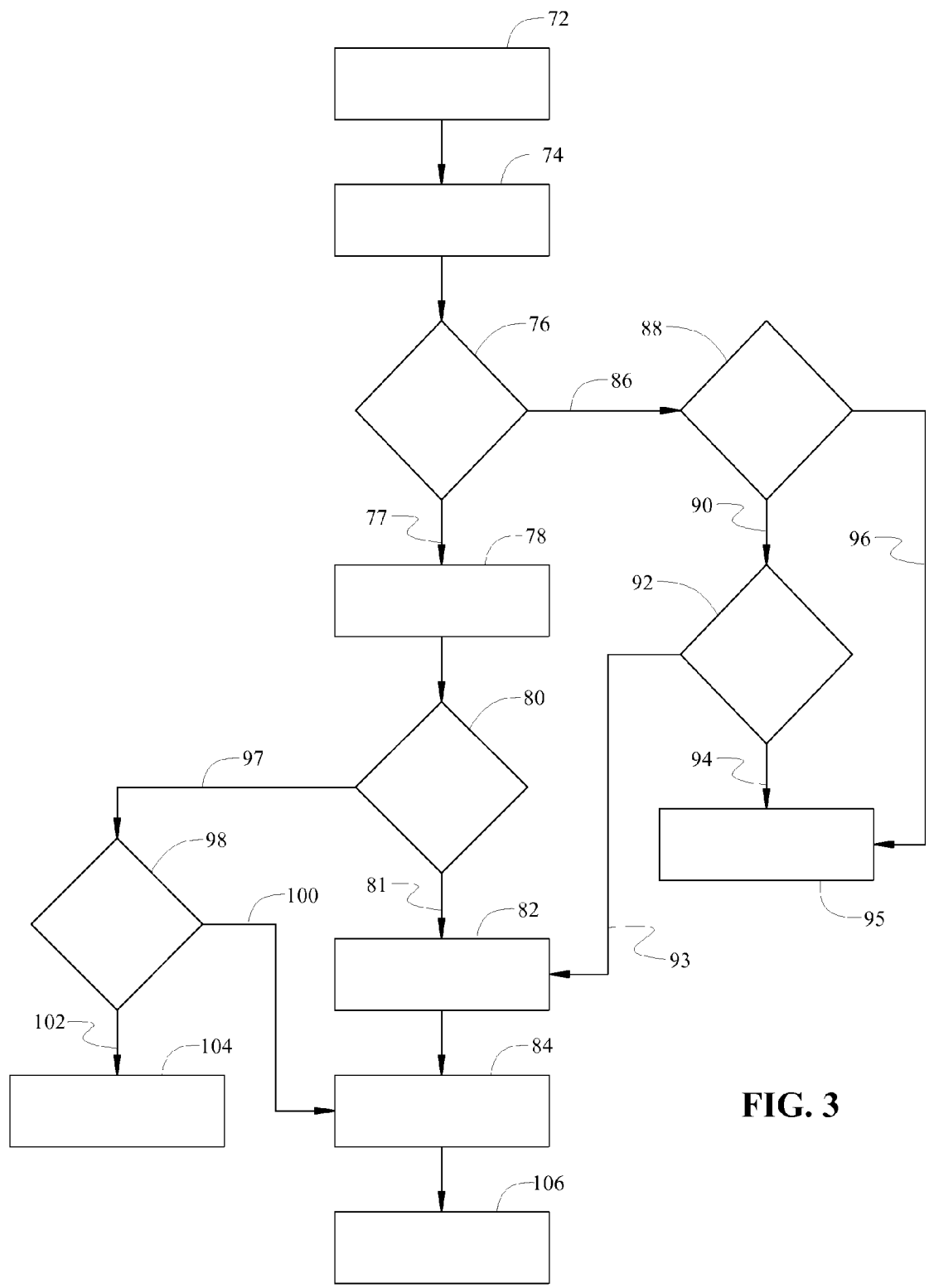
FIG. 3 is a flow chart showing a method of controlling the vehicle.

Referring to FIG. 3, the method includes initiating the auto stop/start engine protocol, block 72. As described above, the auto stop/start engine protocol may include stopping operation of an engine as the vehicle comes to rest, i.e., automatically turning the engine off as the vehicle comes to a stop. The auto stop/start engine protocol may be initiated for a reason other than the vehicle coming to rest.

The method further includes sensing an operational status of the auxiliary hydraulic pump 36, block 74, and determining if the auxiliary hydraulic pump 36 is operable or not operable, block 76. Sensing an operational status of the auxiliary hydraulic pump 36 includes sensing whether the auxiliary hydraulic pump 36 is operable or is not operable. When the auxiliary hydraulic pump 36 is operable, the auxiliary hydraulic pump 36 is engaged, i.e., powered, to provide pressurized hydraulic fluid to the transmission 20 when the operation of the engine is stopped. When the auxiliary hydraulic pump 36 is not operable, the auxiliary hydraulic pump 36 is not engaged, i.e., not powered and does not provide pressurized hydraulic fluid to the transmission 20. The operational status of the auxiliary hydraulic pump 36 may be sensed in any suitable manner, including but not limited to sensors disposed at the auxiliary hydraulic pump 36 for sensing when the auxiliary hydraulic pump 36 is engaged. Alternatively, the vehicle controller may send information to the transmission control module indicating the operation status of the auxiliary hydraulic pump 36. The transmission control module may receive data directly from one or more sensors, or from the vehicle controller, and make the determination whether the auxiliary hydraulic pump 36 is operable or is not operable.

If the auxiliary hydraulic pump 36 is operable, i.e., active, which is indicated at 77, then the method may further include signaling the transmission 20 to shift into a first gear ratio in preparation to launch the vehicle, block 78. Upon the vehicle coming to rest, for example, the vehicle controller may signal the transmission control module to shift the transmission 20 into the lowest gear having the highest gear ratio, i.e., the first gear ratio, in order to prepare the vehicle to move. The transmission control module signals the solenoids, valves, etc. of the transmission 20 to shift the transmission 20 into the first gear ratio.

The method further includes sensing a gear ratio of the transmission 20 after signaling the transmission 20 to shift into the first gear ratio, and determining if the sensed gear ratio is equal to the first gear ratio, block 80. The gear ratio of the transmission 20 may be sensed in any suitable manner. For example, the transmission 20 may include sensors disposed at each clutch and in communication with the transmission control module to sense whether each clutch is engaged or not engaged. The transmission control module may then compare the combination of engaged clutches to a look-up table, similar to the table shown in FIG. 2, to determine which gear ratio the transmission 20 is currently in.

When the sensed gear ratio of the transmission 20 is not equal to the first gear ratio after the transmission control module has signaled for the transmission 20 to shift into the first gear, indicated at 81, and the auxiliary hydraulic pump 36 is sensed as being operable, indicated at 77, the method further includes disabling the auto stop/start engine protocol, block 82. Specifically, the vehicle controller may disable the auto stop/start engine protocol when the sensed gear ratio of the transmission 20 is equal to a fourth gear ratio, which otherwise indicates that the mode control valve 42 failed to move from the off position into the on position to shift the transmission 20 into the first gear ratio. Disabling the auto stop/start engine protocol may include, but is not limited to, disengaging the auxiliary hydraulic pump 36 and starting operation of the engine. Starting operation of the engine also engages the primary hydraulic pump 34, which then provides pressurized hydraulic fluid to the transmission 20. The auxiliary hydraulic pump 36 is disengaged and the operation of the engine is started to engage the primary hydraulic pump 34 to isolate the transmission 20 from the auxiliary hydraulic pump 36 so that the diagnostic algorithms may examine the mode control valve 42 independent of the auxiliary hydraulic pump 36.

When the sensed gear ratio of the transmission 20 is not equal to the first gear ratio, but rather is sensed to be equal to the fourth gear ratio, after the transmission control module has signaled for the transmission 20 to shift into the first gear, and the auxiliary hydraulic pump 36 is sensed as being operable, the method further includes implementing a diagnostic transmission 20 shift control strategy to override a normal transmission shift control strategy, block 84. The diagnostic transmission 20 shift control strategy is implemented to verify proper functionality of the mode control valve 42. Implementing the diagnostic transmission 20 shift control strategy may include, but is not limited to, adjusting a sequencing of at least one solenoid and/or valve of the transmission 20 to encourage the mode control valve 42 to move between the on position and the off position to shift the transmission 20 into the first gear ratio, and increasing a pressure applied by the hydraulic fluid to the mode control valve 42 to move the mode control valve 42. The diagnostic transmission 20 shift control strategy, when isolated from the auxiliary hydraulic pump 36, allows the transmission control module to determine if the mode control valve 42 is functioning properly, or if the failure of the mode control valve 42 to move to shift the transmission 20 into the first gear ratio may have been caused by a failure of the auxiliary hydraulic pump 36. If the mode control valve 42 is able to move between the on position and the off position once isolated from the auxiliary hydraulic pump 36, then the identified failure of the mode control valve 42 is likely a false failure.

When the auxiliary hydraulic pump 36 is not operable, indicated at 86, the method further includes determining if the auto start/stop engine protocol is enabled or disabled, block 88. When the auxiliary hydraulic pump 36 is not operable, and when the auto stop/start engine protocol is disabled, indicated at 90, the method further includes analyzing the mode control valve 42 to determine if the mode control valve 42 is failing or not failing, i.e., is functioning properly or is not functioning properly, block 92. The mode control valve 42 may be analyzed in any suitable manner. For example, the transmission control module may run a diagnostic algorithm on the mode control valve 42 to determine if the mode control valve 42 is failing or not failing.

When mode control valve 42 is determined to be failing, indicated at 93, the method includes maintaining the auto stop/start engine protocol in the disabled condition, block 82. When mode control valve 42 is determined to be not failing, indicated at 94, the method includes enabling the auto stop/start engine protocol, block 95. When the auxiliary hydraulic pump 36 is not operable, indicated at 86, and the auto stop/start engine protocol is enabled, indicated at 96, the method further includes maintaining enablement of the auto stop/start engine protocol, block 95.

When the sensed gear ratio of the transmission 20 is equal to the first gear ratio of the transmission 20 after the transmission control module has signaled the transmission 20 to shift into the first gear ratio, indicated at 97, then the method includes determining if the diagnostic transmission 20 shift strategy is currently active, block 98. The transmission control module may determine if the diagnostic transmission 20 shift strategy is currently active in any suitable manner, including but not limited to, comparing the shift strategy currently being applied to the normal transmission 20 shift strategy and the diagnostic transmission 20 shift strategy.

When the sensed gear ratio of the transmission 20 is equal to the first gear ratio of the transmission 20, and when the diagnostic transmission 20 shift strategy is currently active, indicated at 100, the method may include continuing use of the diagnostic transmission 20 shift strategy to maintain proper functionality of the mode control valve 42, block 84. When the sensed gear ratio of the transmission 20 is equal to the first gear ratio of the transmission 20, and when the diagnostic transmission 20 shift control strategy is not currently active, indicated at 102, the method may further include maintaining the normal transmission shift control strategy and the normal auto stop/start engine protocol, block 104.

The method further includes implementing the normal transmission shift control strategy to override the diagnostic shift control strategy upon the occurrence of a pre-determined event, block 106. The pre-determined event may include, but is not limited to, operation of a pre-identified control and/or diagnostic algorithm, replacement of a malfunctioning part, resetting the transmission control module, or resetting the vehicle controller.

While the best modes for carrying out the invention have been described in detail, those familiar with the art to which this invention relates will recognize various alternative designs and embodiments for practicing the invention within the scope of the appended claims.

The invention claimed is:

1. A method of controlling a vehicle having a transmission, a controller, and an auxiliary hydraulic pump, the method comprising:
   initiating an auto stop/start engine protocol;
   sensing an operational status of the auxiliary hydraulic pump;
   signaling, by the controller, the transmission to shift into a first gear ratio in preparation to launch the vehicle;
   sensing a gear ratio of the transmission after signaling the transmission to shift into the first gear ratio;
   disabling, by the controller, the auto stop/start engine protocol when the sensed gear ratio of the transmission is not equal to the first gear ratio and the auxiliary hydraulic pump is sensed to be operable; and
   implementing a diagnostic transmission shift control strategy to override a normal transmission shift control strategy to verify proper functionality of a mode control valve when the sensed gear ratio of the transmission is not equal to the first gear ratio and the auxiliary hydraulic pump is sensed to be operable;
   determining if the diagnostic transmission shift strategy is currently active when the sensed gear ratio of the transmission is equal to the first gear ratio of the transmission;
   continuing use of the diagnostic transmission shift strategy to maintain proper functionality of the mode control valve when the sensed gear ratio of the transmission is equal to the first gear ratio of the transmission and when the diagnostic transmission shift strategy is currently active;
   maintaining the normal transmission shift control strategy when the sensed gear ratio of the transmission is equal to the first gear ratio of the transmission and when the diagnostic transmission shift control strategy is not currently active.

2. A method as set forth in claim 1 wherein initiating an auto stop/start engine protocol includes stopping operation of an engine.

3. A method as set forth in claim 1 wherein sensing an operational status of the auxiliary hydraulic pump includes sensing whether the auxiliary hydraulic pump is operable to provide pressurized hydraulic fluid to the transmission when the operation of the engine is stopped, or whether the auxiliary hydraulic pump is not operable.

4. A method as set forth in claim 1 wherein disabling the auto stop/start engine protocol includes starting operation of the engine to provide pressurized hydraulic fluid to the transmission.

5. A method as set forth in claim 1 wherein disabling the auto stop/start engine protocol when the sensed gear ratio of the transmission is not equal to the first gear ratio is further defined as disabling the auto stop/start engine protocol when the sensed gear ratio of the transmission is equal to a fourth gear ratio.

6. A method as set forth in claim 1 wherein implementing the diagnostic transmission shift control strategy includes adjusting a sequencing of at least one solenoid of the transmission to encourage the mode control valve to shift the transmission into the first gear ratio.

7. A method as set forth in claim 6 wherein implementing the diagnostic transmission shift control strategy includes increasing a pressure applied by the hydraulic fluid to the mode control valve to move the mode control valve.

8. A method as set forth in claim 1 further comprising determining if the auto start/stop engine protocol is enabled or disabled when the auxiliary hydraulic pump is not operable.

9. A method as set forth in claim 8 further comprising analyzing the control mode valve to determine if the control mode valve is failing or not failing when the auxiliary hydraulic pump is not operable and when the auto stop/start engine protocol is disabled.

10. A method as set forth in claim 1 further comprising implementing the normal transmission shift control strategy to override the diagnostic shift control strategy upon the occurrence of a pre-determined event.

11. A method as set forth in claim 10 wherein the pre-determined event includes operation of a pre-identified control algorithm.

12. A method as set forth in claim 1 wherein the transmission includes five clutches selectively engageable to define six forward gear ratios and one reverse gear ratio.

13. A method as set forth in claim 12 wherein the first gear ratio is a lowest gear having the highest gear ratio of the six forward gear ratios.

14. A method as set forth in claim 13 wherein the mode control valve selectively engages and disengages a first clutch and a fifth clutch to shift between the first gear ratio and a fourth gear ratio.

15. A method of controlling a vehicle having an engine, a controller, a transmission and an auxiliary hydraulic pump, the method comprising:
    stopping operation of the engine;
    engaging operation of the auxiliary hydraulic pump;
    signaling, by the controller, the transmission to shift into a first gear ratio in preparation to launch the vehicle;
    sensing a gear ratio of the transmission after signaling the transmission to shift into the first gear ratio;
    re-engaging, by the controller, operation of the engine when the sensed gear ratio of the transmission is equal to a fourth gear ratio and the auxiliary hydraulic pump is sensed to be operable; and
    implementing a diagnostic transmission shift control strategy to override a normal transmission shift control strategy to verify proper functionality of a mode control valve when the sensed gear ratio of the transmission is not equal to the first gear ratio and the auxiliary hydraulic pump is sensed to be operable;
    determining if the diagnostic transmission shift strategy is currently active when the sensed gear ratio of the transmission is equal to the first gear ratio of the transmission;
    continuing use of the diagnostic transmission shift strategy to maintain proper functionality of the mode control valve when the sensed gear ratio of the transmission is equal to the first gear ratio of the transmission and when the diagnostic transmission shift strategy is currently active;
    maintaining the normal transmission shift control strategy when the sensed gear ratio of the transmission is equal to the first gear ratio of the transmission and when the diagnostic transmission shift control strategy is not currently active.

16. A method as set forth in claim 15 wherein implementing the diagnostic transmission shift control strategy includes adjusting a sequencing of at least one solenoid of the transmission to encourage the mode control valve to shift the transmission into the first gear ratio.

17. A method as set forth in claim 15 further comprising implementing the normal transmission shift control strategy to override the diagnostic shift control strategy upon the occurrence of a pre-determined event.

* * * * *